(12) United States Patent
Vishwanath et al.

(10) Patent No.: US 12,703,314 B2
(45) Date of Patent: Aug. 11, 2026

(54) SYSTEM AND METHOD FOR DISTRIBUTING AUXILIARY POWER TO LOADS ONBOARD OF A TRAIN, AND TRAIN COMPRISING SUCH A SYSTEM

(71) Applicant: ALSTOM Holdings, Saint-Ouen-sur-Seine (FR)

(72) Inventors: Gandhal Vishwanath, Bangalore (IN); Veliyambra Umesh Babu, Bangalore (IN)

(73) Assignee: ALSTOM HOLDINGS, Saint-Ouen-sur-Seine (FR)

( * ) Notice: Subject to any disclaimer, the term of this patent is extended or adjusted under 35 U.S.C. 154(b) by 129 days.

(21) Appl. No.: 18/741,474

(22) Filed: Jun. 12, 2024

(65) Prior Publication Data

US 2024/0416854 A1 Dec. 19, 2024

(30) Foreign Application Priority Data

Jun. 15, 2023 (IN) ............................. 202311040785

(51) Int. Cl.
*B60R 16/03* (2006.01)

(52) U.S. Cl.
CPC ....... *B60R 16/0307* (2013.01); *B60Y 2200/33* (2013.01)

(58) Field of Classification Search
CPC ........................ B60R 16/0307; B60Y 2200/33
See application file for complete search history.

(56) References Cited

U.S. PATENT DOCUMENTS

2021/0155095 A1* 5/2021 Hu .......................... B60L 15/32

FOREIGN PATENT DOCUMENTS

| | | | | |
|---|---|---|---|---|
| CN | 202080152 U | | 12/2011 | |
| CN | 202616864 U | * | 12/2012 | |
| CN | 208664972 U | | 3/2019 | |
| CN | 112277985 A | | 1/2021 | |
| CN | 115723573 A | * | 3/2023 | |
| EP | 3922502 A1 | | 12/2021 | |
| JP | 2024103389 A | * | 8/2024 | ............. B60L 58/20 |
| KR | 100786670 B1 | | 12/2007 | |
| WO | WO-2020199680 A1 | * | 10/2020 | ................ B60L 3/04 |

* cited by examiner

*Primary Examiner* — Daniel Cavallari
(74) *Attorney, Agent, or Firm* — Knobbe, Martens, Olson & Bear, LLP

(57) ABSTRACT

A system for distributing auxiliary power onboard of a train including a first car, a second car, and a third car equipped each with electric loads, including: a power distribution line extending across the cars; a first, a second and a third auxiliary power generators each configured to supply power to the electric loads on the first, second and third cars, respectively; a first and a second auxiliary power switching devices positioned along the power distribution line between the first and second auxiliary power generators and between the second and third power generators, respectively; a third and a fourth auxiliary power switching devices positioned along the power distribution line at the second car. When one of the auxiliary power generators is faulty, loads installed on the car affected by the faulty generator are supplied by one of the other auxiliary power generators via switching of the power switching devices.

6 Claims, 2 Drawing Sheets

SYSTEM AND METHOD FOR DISTRIBUTING AUXILIARY POWER TO LOADS ONBOARD OF A TRAIN, AND TRAIN COMPRISING SUCH A SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD

The present disclosure relates to a system and to a method for distributing auxiliary power to loads onboard of a train, and to a train comprising such a system.

BACKGROUND

As known, trains are usually composed by a plurality of cars equipped each with loads, such as HVAC systems, toilets, air generation treatment units, power outlets etc., which need to be electrically supplied when the train is in service.

To this end, at least one power generator is usually installed onboard of each car to supply the loads of the corresponding car.

During operations, when for whatever reason a power generator is not properly working, the loads of the car affected by the faulty power generator are supplied with power provided by the power generator positioned on an adjacent car.

Although this solution allows to properly supply the loads of a car with a faulty power generator, it entails some aspects which are not completely satisfying.

In particular, nowadays each power generator has to be designed so that its power output capability is approximately doubled with respect to the one that would be normally required in order to supply only the loads of the car on which it is installed.

Clearly, this entails an increase of manufacturing costs and renders the installation more cumbersome due for example to the spaces and weights required for the power generators having such doubled power output capability.

SUMMARY

Hence, the present disclosure is aimed at facing and at least partially mitigating such issues.

Accordingly, there is hereby provided a system for distributing auxiliary power onboard of a train comprising at least a first car equipped with a first plurality of electric loads, a second car which is attached to the first car and is equipped with a second plurality of electric loads, and a third car which is attached to the second car and is equipped with a third plurality of electric loads, wherein the system comprises at least:

- a power distribution line which is suitable to be installed on board of the train extending across said first, second and third cars;
- a first auxiliary power generator which is suitable to be installed on board of the first car and to be connected to the power distribution line, said first auxiliary power generator being configured to supply power at least to the first plurality of electric loads;
- a second auxiliary power generator which is suitable to be installed on board of the second car and to be connected to the power distribution line, said second auxiliary power generator being configured to supply power at least to the second plurality of electric loads;
- a third auxiliary power generator which is suitable to be installed on board of the third car and to be connected to the power distribution line, said third auxiliary power generator being configured to supply power at least to the third plurality of electric loads;
- a first auxiliary power switching device and a second auxiliary power switching device which are suitable to be positioned along the power distribution line between the first and second auxiliary power generators and between the second and third power generators, respectively, wherein the first and second auxiliary power switching devices are configured to switch both between an open position when the first, second and third auxiliary power generators are under a normal condition and supply the corresponding first, second and third plurality of electric loads, respectively, and a closed position when one of the first, second and third auxiliary power generators is in a faulty condition and is not capable of supplying the corresponding first, or second, or third plurality of electric loads;
- a third auxiliary power switching device and a fourth auxiliary power switching device which are suitable to be positioned along the power distribution line at the second car, between the first auxiliary power switching device and the second auxiliary power generator and between the second auxiliary power switching device and the second auxiliary power generator, respectively, wherein a first subset of electric loads of the second plurality of electric loads is suitable to be connected to the power distribution line at a point between the first auxiliary power switching device and the third auxiliary power switching device, and a second subset of electric loads of the second plurality of electric loads is suitable to be connected to the power distribution line at a point between the second auxiliary power switching device and the fourth auxiliary power switching device;
- wherein the third auxiliary power switching device is configured to switch from a normally closed position when the first, second and third auxiliary power generators are in said normal condition to an open position when one of the second and third auxiliary power generators is in said faulty condition; and
- wherein the fourth auxiliary power switching device is configured to switch from a normally closed position when the first, second and third auxiliary power generators are in said normal condition to an open position when one of the first and second auxiliary power generators is in said faulty condition.

The present disclosure also provides a method for distributing auxiliary power onboard of a train comprising at least a first car equipped with a first plurality of electric loads, a second car which is attached to the first car and is equipped with a second plurality of electric loads, and a third car which is attached to the second car and is equipped with a third plurality of electric loads, wherein the method comprises at least:

- a first phase which comprises providing on board of the train:
- a power distribution line extending across said first, second and third cars;

- a first auxiliary power generator suitable to be connected to the power distribution line, said first auxiliary power generator being configured to supply power at least to the first plurality of electric loads;
- a second auxiliary power generator suitable to be connected to the power distribution line, said second auxiliary power generator being configured to supply power at least to the second plurality of electric loads;
- a third auxiliary power generator suitable to be connected to the power distribution line, said third auxiliary power generator being configured to supply power at least to the third plurality of electric loads;
- a first auxiliary power switching device and a second auxiliary power switching device which are suitable to be positioned along the power distribution line between the first and second auxiliary power generators and between the second and third power generators, respectively;
- a third auxiliary power switching device and a fourth auxiliary power switching device which are suitable to be positioned along the power distribution line at the second car, between the first auxiliary power switching device and the second auxiliary power generator and between the second auxiliary power switching device and the second auxiliary power generator, respectively, wherein a first subset of electric loads of the second plurality of electric loads is connected to the power distribution line at a point between the first auxiliary power switching device and the third auxiliary power switching device, and a second subset of electric loads of the second plurality of electric loads is connected to the power distribution line at a point between the second auxiliary power switching device and the fourth auxiliary power switching device;
- a second phase which comprises switching both the first and second auxiliary power switching devices from an open position when the first, second and third auxiliary power generators are under a normal condition and supply the corresponding first, second and third plurality of electric loads, respectively, to a second closed position when one of the first, second and third auxiliary power generators is in a faulty condition and is not capable of supplying the corresponding first, or second, or third plurality of electric loads;
- a third phase which comprises at least one of switching the third auxiliary power switching device from a closed position when the first, second and third auxiliary power generators are in said normal condition to an open position when one of the second and third auxiliary power generators is in said faulty condition, or keeping the third auxiliary power switching device in the closed position when the first auxiliary power generator is in said faulty condition;
- a fourth phase which comprises at least one of switching the fourth auxiliary power switching device from a normally closed position when the first, second and third auxiliary power generators are in said normal condition to an open position when one of the first and second auxiliary power generators is in said faulty condition, or keeping the fourth auxiliary power switching device in the normally closed position when the third auxiliary power generator is in said faulty condition.

Finally, the present disclosure provides also a train comprising at least a first car equipped with a first plurality of electric loads, a second car which is attached to the first car and is equipped with a second plurality of electric loads, and a third car which is attached to the second car and is equipped with a third plurality of electric loads, and a system for distributing auxiliary power onboard of the train, wherein the system comprises at least:

- a power distribution line which is suitable to be installed on board of the train extending across said first, second and third cars;
- a first auxiliary power generator which is suitable to be installed on board of the first car and to be connected to the power distribution line, said first auxiliary power generator being configured to supply power at least to the first plurality of electric loads;
- a second auxiliary power generator which is suitable to be installed on board of the second car and to be connected to the power distribution line, said second auxiliary power generator being configured to supply power at least to the second plurality of electric loads;
- a third auxiliary power generator which is suitable to be installed on board of the third car and to be connected to the power distribution line, said third auxiliary power generator being configured to supply power at least to the third plurality of electric loads;
- a first auxiliary power switching device and a second auxiliary power switching device which are suitable to be positioned along the power distribution line between the first and second auxiliary power generators and between the second and third power generators, respectively, wherein the first and second auxiliary power switching devices are configured to switch both between an open position when the first, second and third auxiliary power generators are under a normal condition and supply the corresponding first, second and third plurality of electric loads, respectively, and a closed position when one of the first, second and third auxiliary power generators is in a faulty condition and is not capable of supplying the corresponding first, or second, or third plurality of electric loads;
- a third auxiliary power switching device and a fourth auxiliary power switching device which are suitable to be positioned along the power distribution line at the second car, between the first auxiliary power switching device and the second auxiliary power generator and between the second auxiliary power switching device and the second auxiliary power generator, respectively, wherein a first subset of electric loads of the second plurality of electric loads is suitable to be connected to the power distribution line at a point between the first auxiliary power switching device and the third auxiliary power switching device, and a second subset of electric loads of the second plurality of electric loads is suitable to be connected to the power distribution line at a point between the second auxiliary power switching device and the fourth auxiliary power switching device;
- wherein the third auxiliary power switching device is configured to switch from a normally closed position when the first, second and third auxiliary power generators are in said normal condition to an open position when one of the second and third auxiliary power generators is in said faulty condition; and
- wherein the fourth auxiliary power switching device is configured to switch from a normally closed position when the first, second and third auxiliary power generators are in said normal condition to an open position when one of the first and second auxiliary power generators is in said faulty condition.

BRIEF DESCRIPTION OF THE DRAWINGS

Further characteristics and advantages will become apparent from the description of some preferred but not exclusive exemplary embodiments of a system and method switch according to the present disclosure, illustrated only by way of non-limitative examples with the accompanying drawings, wherein.

DETAILED DESCRIPTION

Figure 1:
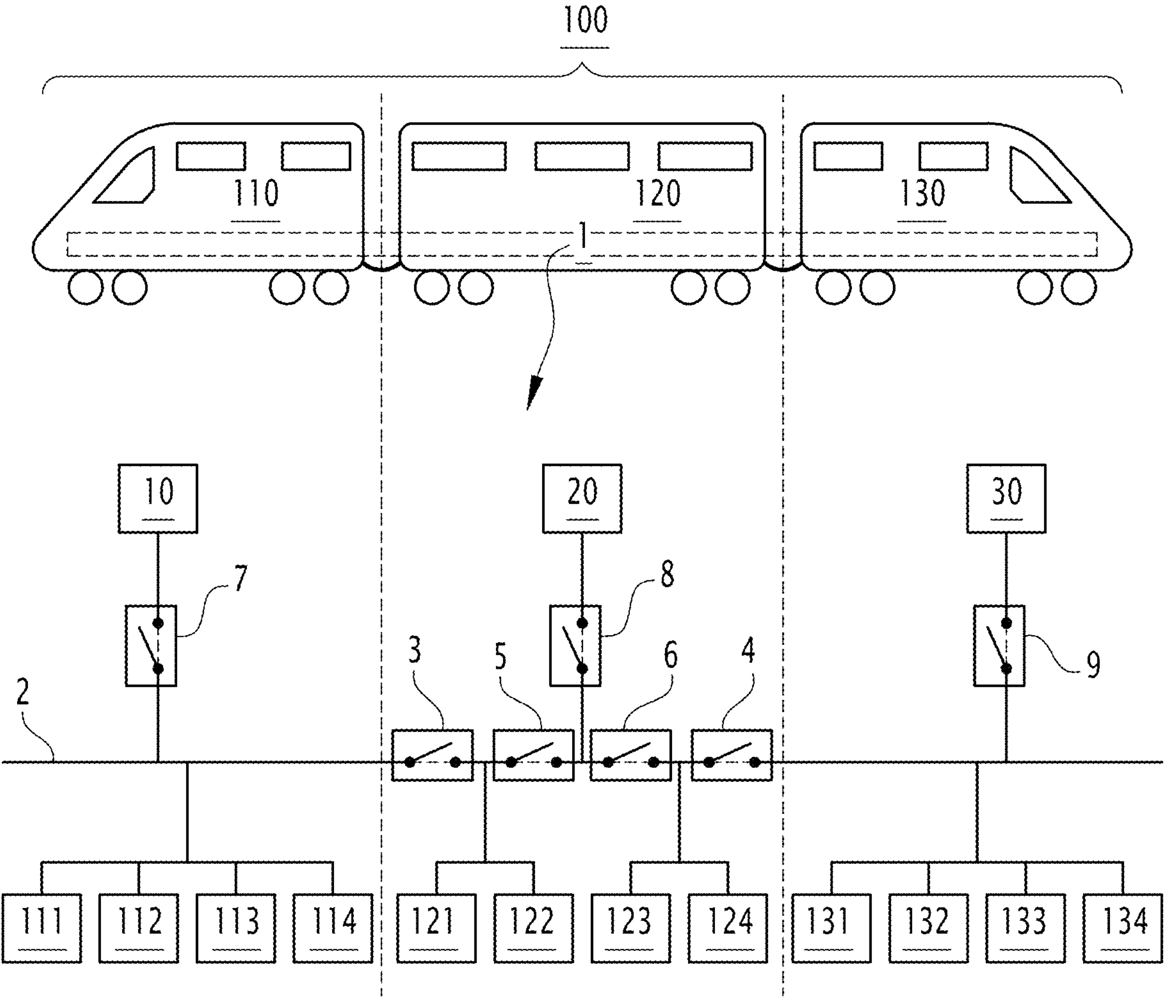
FIG. 1 schematically illustrates a system for distributing auxiliary power to loads onboard of a train, according to the present disclosure.

It should be noted that in the detailed description that follows, identical or similar components, either from a structural and/or functional point of view, have the same reference numerals, regardless of whether they are shown in different embodiments of the present disclosure; it should also be noted that in order to clearly and concisely describe the present disclosure, the drawings may not necessarily be to scale and certain features of the disclosure may be shown in somewhat schematic form.

Further, when the term "adapted" or "arranged" or "configured" or "shaped", or "set" is used herein while referring to any component as a whole, or to any part of a component, or to a combination of components, it has to be understood that it means and encompasses correspondingly either the structure, and/or configuration and/or form and/or positioning of the related component or part thereof, or combinations, such term refers to.

In particular, for electronic and/or software means, each of the above listed terms means and encompasses electronic circuits or parts thereof, as well as stored, embedded or running software codes and/or routines, algorithms, or complete programs, suitably designed for achieving the technical result and/or the functional performances for which such means are devised.

In addition, when the term "about", or "substantial", or "substantially", or "approximately", is used herein, it has to be understood as encompassing an actual variation of plus or minus 5% with respect to an indicated reference value, axis, time or position.

Finally, in the following description and claims, the numeral ordinals first, second, third, will be used only for the sake of clarity of description and in no way they should be understood as limiting for whatsoever reason, nor that the order should be the one described in the illustrated exemplary embodiment(s); for example, in the following description and relevant appended claims, the definition of "third phase" and "fourth phase" will be used, and such phases are not necessarily carried out in the order described, rather they can be executed substantially simultaneously or in whatever possible order between each other.

FIG. 1 schematically illustrates a system 1 for distributing auxiliary power onboard of a train 100.

In the exemplary embodiment illustrated, the train 100 comprises at least:

- a first car 110 equipped with a first plurality of electric loads 111, 112, 113, 114;
- a second car 120 which is attached to the first car 110 and is equipped with a second plurality of electric loads 121, 122, 123, 124; and
- a third car 130 which is attached to the second car 120 and is equipped with a third plurality of electric loads 131, 132, 133, 134.

Each of the loads to be supplied with electric powers can be of any type usually installed on boards of trains, such HVAC systems, toilets, air generation treatment units, power outlets for different services, such as catering, etc.

The term "car" used herein has to be understood as encompassing any unit that may be part of a railway convoy, and that can be referred with alternative or synonymous terms such as for instance wagon, coaches, etc.

Clearly, the train 100 can comprise any suitable number of cars.

As illustrated, the system 1 comprises at least:

- a power distribution line 2 which is suitable to be installed on board of the train 100 extending across said first, second and third cars 110, 120, 130;
- a first auxiliary power generator 10 which is suitable to be installed on board of the first car 110 and to be connected to the power distribution line 2, the first auxiliary power generator 10 being configured to supply power at least to the first plurality of electric loads 111, 112, 113,114;
- a second auxiliary power generator 20 which is suitable to be installed on board of the second car 120 and to be connected to the power distribution line 2, the second auxiliary power generator 20 being configured to supply power at least to the second plurality of electric loads 121, 122, 123, 124;
- a third auxiliary power generator 30 which is suitable to be installed on board of the third car 130 and to be connected to the power distribution line 2, the third auxiliary power generator 30 being configured to supply power at least to the third plurality of electric loads 131, 132, 133, 134;
- a first auxiliary power switching device 3 which is suitable to be positioned along the power distribution line 2 between the first and second auxiliary power generators 10 and 20, and a second auxiliary power switching device 4 which is suitable to be positioned along the power distribution line 2 between the second and third power generators 20 and 30, respectively.

In the exemplary embodiment illustrated schematically in FIG. 1, the first and second power auxiliary devices 3 and 4 are shown installed at the second car 120; however, as those skilled in the art would appreciate, they can be installed along the power distribution line 2 at the first car 110 and at the third car 130, respectively.

In one possible embodiment, at least one of the first, second and third auxiliary power generators 10, 20 and 30, comprises an alternator, in particular an asynchronous alternator.

In particular, the first and second auxiliary power switching devices 3, 4 are configured to switch both between an open position when the first, second and third auxiliary power generators 10, 20, 30 are under a normal condition, i.e. each of them regularly supplies the corresponding first, second and third plurality of electric loads, respectively, and a closed position when one of the first, second and third auxiliary power generators 10, 20, 30 is in a faulty condition and thus is not capable of power supplying the associated first, or second, or third plurality of electric loads.

Usefully, the system 1 according to the present disclosure further comprises a third auxiliary power switching device 5 and a fourth auxiliary power switching device 6, which are suitable to be positioned along the power distribution line 2 at the second car 120.

As illustrated, the third auxiliary power switching device 5 and the fourth auxiliary power switching device 6 are positioned along the power distribution line 2 in series to each other and with and between the first auxiliary power switching device 3 and the second auxiliary power switching device 4.

The third auxiliary power switching device 5 is positioned between the first auxiliary power switching device 3 and the second auxiliary power generator 20, so that a first subset of electric loads of the second plurality of electric loads, e.g. loads 121, 122, is connected to the power distribution line 2 at a point between the first auxiliary power switching device 3 and the third auxiliary power switching device 5.

The fourth auxiliary power switching device 6 is positioned between the second auxiliary power switching device 4 and the second auxiliary power generator 20, so that a second subset of electric loads of the second plurality of electric loads, e.g. loads 123, 124, is connected to the power distribution line 2 at a point between the second auxiliary power switching device 4 and the fourth auxiliary power switching device 6.

In this way, the third and fourth auxiliary power switching devices 5 and 6 allow to form on the second car 120, from an electrical supplying point of view, two subsets or clusters of loads which can be separately supplied as it will become more apparent from the following description.

In particular, each of the two subsets of loads can be formed by any suitable number of loads selected from the second plurality of electrical loads 121, 122, 123 and 124, and they can be preferably selected so that the total power required for them is substantially equally divided between the load(s) of the first subset and the load(s) of the second subset.

In the system 1 according to the present disclosure, the third auxiliary power switching device 5 is configured to switch from a closed position when the first, second and third auxiliary power generators 10, 20, 30 are in said normal condition, to an open position when one of the second and third auxiliary power generators 20, 30 is in the faulty condition;

In turn, the fourth auxiliary power switching device 6 is configured to switch from a closed position when the first, second and third auxiliary power generators 10, 20, 30 are in said normal condition, to an open position when one of the first and second auxiliary power generators 10, 20 is in said faulty condition.

In the system 1 according to the present disclosure, when the first auxiliary power generator 10 is in the faulty condition, the first and second auxiliary power switching devices 3, 4 are configured to switch into the closed position, the third auxiliary power switching device 5 is configured to remain in the closed position and the fourth auxiliary power switching device 6 is configured to switch into the open position.

In this way, the first plurality of electric loads 111, 112, 113 and 114 and the first subset of electric loads, e.g. loads 121, 122, are supplied with power provided by the second auxiliary power generator 20, while the third plurality of electric loads 131, 132, 133 and 134, and the second subset of electric loads, e.g. loads 123 and 124, are supplied by the third auxiliary power generator 30.

When the second auxiliary power generator 20 is in the faulty condition, the first and second auxiliary power switching devices 3, 4 are configured to switch into the closed position, the third and fourth auxiliary power switching devices 5 and 6 are configured to switch into the open position.

In this way, the first plurality of electric loads 111, 112, 113 and 114 and the first subset of electric loads, e.g. loads 121 and 122, are supplied with power provided by the first auxiliary power generator 10, while the third plurality of electric loads 131, 132, 133 and 134, and the second subset of electric loads, e.g. loads 123 and 124, are supplied with power provided by the third auxiliary power generator 30.

When the third auxiliary power generator 30 is in the faulty condition, the first and second auxiliary power switching devices 3 and 4 are configured to switch into the closed position, the third auxiliary power switching device 5 is configured to switch into the open position and the fourth auxiliary power switching device 6 is configured to remain in the closed position.

In this way, the third plurality of electric loads 131, 132, 133 and 134, and the second subset of electric loads, e.g. loads 123 and 124, are supplied with power provided by the second auxiliary power generator 20, while the first plurality of electric loads 111, 112, 113 and 114, and the first subset of electric loads, e.g. loads 121 and 122, are supplied by the first auxiliary power generator 10.

In one possible embodiment, at least one of said first, second, third and fourth auxiliary power switching devices 3, 4, 5 and 6, preferably each of them, comprises a power contactor.

Each power contactor can be on any suitable type available on the market and, as well known in the art, comprises a couple of contacts which can be switched between a closed position where the contactor is in an "ON" or closed position/status and flow of power through it is permitted, and an "OFF" or open position/status where flow of power through it is prevented.

As illustrated in FIG. 1, in one possible embodiment, the system 1 further comprises a first main power switching device 7, a second main power switching device 8, and a third main power switching devices 9, which are configured to electrically connect to/disconnect from the power distribution line 2 the first, second and third power generators 10, 20, 30 respectively.

In one possible embodiment, at least one of the first, second and third main power switching devices 7, 8 and 9, preferably each of them, comprises a power contactor.

Such a power contactor can be of the same type or of a different type with respect to the contactor(s) used for realizing the first, and/or second and/or third, and/or fourth auxiliary power switching devices 3, 4, 5 and 6.

Clearly, the system 1 can comprise other devices, components, such as batteries, battery chargers, etc., which are not relevant for the present disclosure and thus are not described herein in details.

Figure 2:
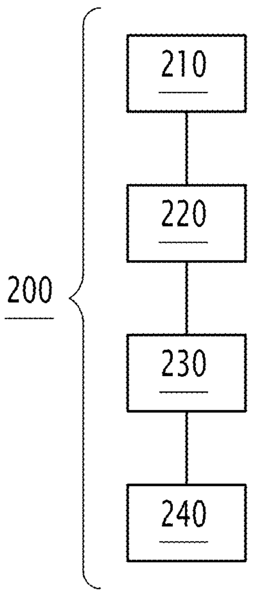
FIG. 2 is a flow diagram schematically illustrating a method for distributing auxiliary power to loads onboard of a train, according to the present disclosure.

FIG. 2 schematically illustrates a method 200 for distributing auxiliary power onboard of a train, such as the train 100 as previously described.

The method 200 according to the present disclosure comprises a first phase 210 that comprises providing, on board of the train 100:

- a power distribution line 2 extending across the first, second and third cars 110, 120, 130;
- a first auxiliary power generator 10 suitable to be connected to the power distribution line 2, the first auxiliary power generator 10 being configured to supply power at least to the first plurality of electric loads 111, 112, 113, 114;

a second auxiliary power generator 20 suitable to be connected to the power distribution line 2, the second auxiliary power generator 20 being configured to supply power at least to the second plurality of electric loads 121, 122, 123, 124;

a third auxiliary power generator 30 suitable to be connected to the power distribution line 2, the third auxiliary power generator 30 being configured to supply power at least to the third plurality of electric loads 131, 132, 133, 134;

a first auxiliary power switching device 3 and a second auxiliary power switching device 4 which are suitable to be positioned along the power distribution line 2 between the first and second auxiliary power generators 10, 20 and between the second and third power generators 20, 30, respectively;

a third auxiliary power switching device 5 and a fourth auxiliary power switching device 6 which are suitable to be positioned along the power distribution line 2 at the second car 120, between the first auxiliary power switching device 3 and the second auxiliary power generator 20 and between the second auxiliary power switching device 4 and the second auxiliary power generator 20, respectively, wherein a first subset of electric loads 121, 122 of the second plurality of electric loads is connected to the power distribution line 2 at a point between the first auxiliary power switching device 3 and the third auxiliary power switching device 5, and a second subset of electric loads 123, 124 of the second plurality of electric loads is connected to the power distribution line 2 at a point between the second auxiliary power switching device 4 and the fourth auxiliary power switching device 6.

The method 200 according to the present disclosure further comprises:

a second phase 220 which comprises switching both the first and second auxiliary power switching devices 3, 4 from an open position when the first, second and third auxiliary power generators 10, 20, 30 are under a normal condition and supply the corresponding first, second and third plurality of electric loads, respectively, to a second closed position when one of the first, second and third auxiliary power generators 10, 20, 30 is in a faulty condition and is not capable of supplying the corresponding first, or second, or third plurality of electric loads;

a third phase 230 which comprises at least one of switching the third auxiliary power switching device 5 from a closed position when the first, second and third auxiliary power generators 10, 20, 30 are in said normal condition to an open position when one of the second and third auxiliary power generators 20, 30 is in said faulty condition, or keeping the third auxiliary power switching device 5 in the closed position when the first auxiliary power generator 10 is in said faulty condition;

a fourth phase 240 which comprises at least one of switching the fourth auxiliary power switching device 6 from a normally closed position when the first, second and third auxiliary power generators 10, 20, 30 are in said normal condition, to an open position when one of the first and second auxiliary power generators 10, 20 is in said faulty condition, or keeping the fourth auxiliary power switching device 6 in the normally closed position when the third auxiliary power generator 30 is in said faulty condition.

In particular, in the method 200 according to the present disclosure, when the first auxiliary power generator 10 is in said faulty condition, the first and second auxiliary power switching devices 3 and 4 switch both in the closed position, the third phase 230 comprises keeping the third auxiliary power switching device 5 in the closed position, and the fourth phase 240 comprises switching the fourth auxiliary power switching device 6 from the closed position into the open position, thereby allowing supply of power for the first plurality of electric loads 111, 112, 113 and 114, and the first subset of electric loads 121, 122 from the second auxiliary power generator 20, while the third plurality of electric loads 131, 132, 133 and 134, and the second subset of electric loads 123 and 124, are supplied by the third auxiliary power generator 30.

When the second auxiliary power generator 20 is in said faulty condition, the first and second auxiliary power switching devices 3 and 4 switch both in the closed position, the third phase 230 comprises switching the third auxiliary power switching device 5 from the closed position in the open position, and the fourth phase 240 comprises switching the fourth auxiliary power switching device 6 from the closed position into the open position, thereby allowing supply of power for the first plurality of electric loads 111, 112, 113 and 114, and the first subset of electric loads 121 and 122, from the first auxiliary power generator 10, while the third plurality of electric loads 131, 132, 133 and 134, and the second subset of electric loads 123 and 124, are supplied by the third auxiliary power generator 30.

When the third auxiliary power generator 30 is in said faulty condition, the first and second auxiliary power switching devices 3 and 4 are configured to switch both in the closed position, the third phase 230 comprises switching the third auxiliary power switching device 5 from the closed position in the open position, and the fourth phase 240 comprises keeping the fourth auxiliary power switching device 6, thereby allowing supply of power for the third plurality of electric loads 131, 132, 133 and 134, and the second subset of electric loads 123 and 124, from the second auxiliary power generator 20, while the first plurality of electric loads 111, 112, 113 and 114 and the first subset of electric loads 121 and 122 are supplied by the first auxiliary power generator 10.

It is evident from the foregoing description, that when the first, second and third auxiliary power generators 10, 20, 30 are under a normal condition, the first and second auxiliary power switching devices 3, 4 remain in the open position and the third and fourth auxiliary power switching device 5 and 6 remain in the closed position, such that each of the first, second and third auxiliary power generators 10, 20, 30 supplies the corresponding first, second and third plurality of electric loads.

Hence, it is evident from the foregoing description that the system 1 and method 200 according to the present disclosure allow achieving the intended aim since, thanks to the adoption and mutual positioning of the first, second third and fourth auxiliary power switching devices 3, 4, 5 and 6, the electric loads of at least once of the cars, e.g. the second car 120 positioned between the first and third cars 110 and 130, are divided into two subsets. Thus, whenever one of the power generators 10, 20 and 30 enters into a faulty state, all loads, including also those of the car affected by the faulty power generator, are properly supplied by the remaining generators which share the total power needed for supplying the loads of the second car 120.

Accordingly, each power generator can be designed to provide the power output needed for supplying the loads installed on the own car and associated to it, and only a part, e.g. 50%, of the loads installed in the second car 120, and therefore its size is reduced and does not need to be doubled as it occurs instead for the current state of the art solutions.

These results are achieved according to a solution quite easy to be realized and installed, and can be used in new train as well as for retrofitting trains already in service.

Hence, the present disclosure encompasses also a train comprising a system 1 as previously described and in particular as defined in the relevant appended claims.

The system 1 and method 200 thus conceived are susceptible of modifications and variations, all of which are within the scope of the inventive concept as defined in particular by the appended claims; all the details may furthermore be replaced with technically equivalent elements.

What is claimed is:

1. A system for distributing auxiliary power onboard of a train comprising at least a first car equipped with a first plurality of electric loads, a second car which is attached to the first car and is equipped with a second plurality of electric loads, and a third car which is attached to the second car and is equipped with a third plurality of electric loads, the system comprising:

- a power distribution line configured to be installed on board of the train extending across said first, second and third cars;
- a first auxiliary power generator configured to be installed on board of the first car and to be connected to the power distribution line, said first auxiliary power generator being configured to supply power at least to the first plurality of electric loads;
- a second auxiliary power generator configured to be installed on board of the second car and to be connected to the power distribution line, said second auxiliary power generator being configured to supply power at least to the second plurality of electric loads;
- a third auxiliary power generator configured to be installed on board of the third car and to be connected to the power distribution line, said third auxiliary power generator being configured to supply power at least to the third plurality of electric loads;
- a first auxiliary power switching device and a second auxiliary power switching device configured to be positioned along the power distribution line between the first and second auxiliary power generators and between the second and third auxiliary power generators, respectively, wherein the first and second auxiliary power switching devices are configured to switch both between an open position when the first, second and third auxiliary power generators are under a normal condition and supply the corresponding first, second, and third plurality of electric loads, respectively, and a closed position when one of the first, second and third auxiliary power generators is in a faulty condition and is not capable of supplying the corresponding first, or second, or third plurality of electric loads; and
- a third auxiliary power switching device and a fourth auxiliary power switching device configured to be positioned along the power distribution line at the second car, between the first auxiliary power switching device and the second auxiliary power generator and between the second auxiliary power switching device and the second auxiliary power generator, respectively, wherein a first subset of electric loads of the second plurality of electric loads is configured to be connected to the power distribution line at a point between the first auxiliary power switching device and the third auxiliary power switching device, and a second subset of electric loads of the second plurality of electric loads is configured to be connected to the power distribution line at a point between the second auxiliary power switching device and the fourth auxiliary power switching device,
- wherein the third auxiliary power switching device is configured to switch from a normally closed position when the first, second and third auxiliary power generators are in said normal condition to an open position when one of the second and third auxiliary power generators is in said faulty condition, and
- wherein the fourth auxiliary power switching device is configured to switch from a normally closed position when the first, second and third auxiliary power generators are in said normal condition to an open position when one of the first and second auxiliary power generators is in said faulty condition.

2. The system of claim 1, wherein, when the first auxiliary power generator is in said faulty condition, the third auxiliary power switching device is configured to remain in said closed position and the fourth auxiliary power switching device is configured to switch into said open position, thereby allowing supply of power for the first plurality of electric loads and the first subset of electric loads from the second auxiliary power generator, while the third plurality of electric loads and the second subset of electric loads are supplied by the third auxiliary power generator.

3. The system of claim 1, wherein, when the second auxiliary power generator is in said faulty condition, the third and fourth auxiliary power switching devices are configured to switch into said open position, thereby allowing supply of power for the first plurality of electric loads and the first subset of electric loads from the first auxiliary power generator, while the third plurality of electric loads and the second subset of electric loads are supplied by the third auxiliary power generator.

4. The system of claim 1, wherein, when the third auxiliary power generator is in said faulty condition, the third auxiliary power switching device is configured to switch into said open position and the fourth auxiliary power switching device is configured to remain in said closed position, thereby allowing supply of power for the third plurality of electric loads and the second subset of electric loads from the second auxiliary power generator, while the first plurality of electric loads and the first subset of electric loads are supplied by the first auxiliary power generator.

5. The system of claim 1, wherein at least one of said first, second, third, and fourth auxiliary power switching devices comprises a power contactor.

6. A train comprising the system of claim 1.

* * * * *